Figure 7:
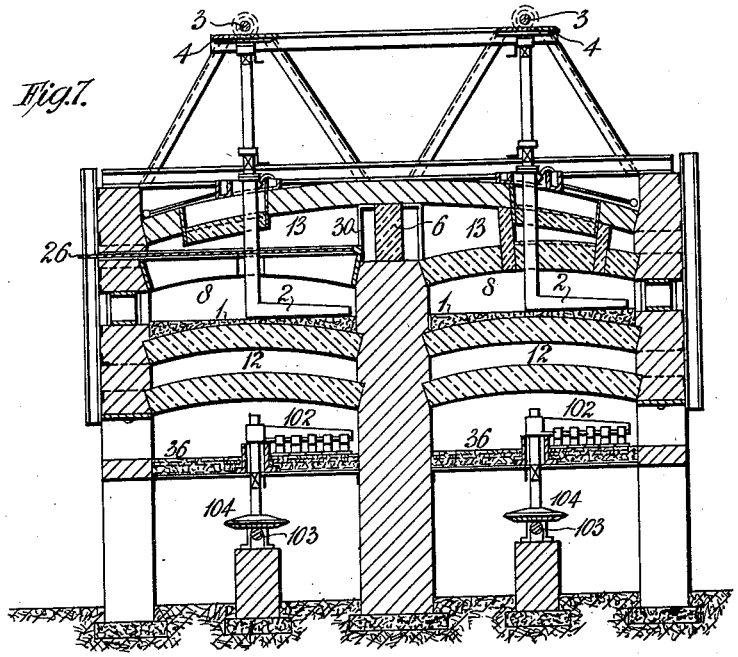

T. EDWARDS.
ORE ROASTING FURNACE.
APPLICATION FILED JAN. 18, 1911.
1,008,892.
Patented Nov. 14, 1911.
8 SHEETS—SHEET 1.
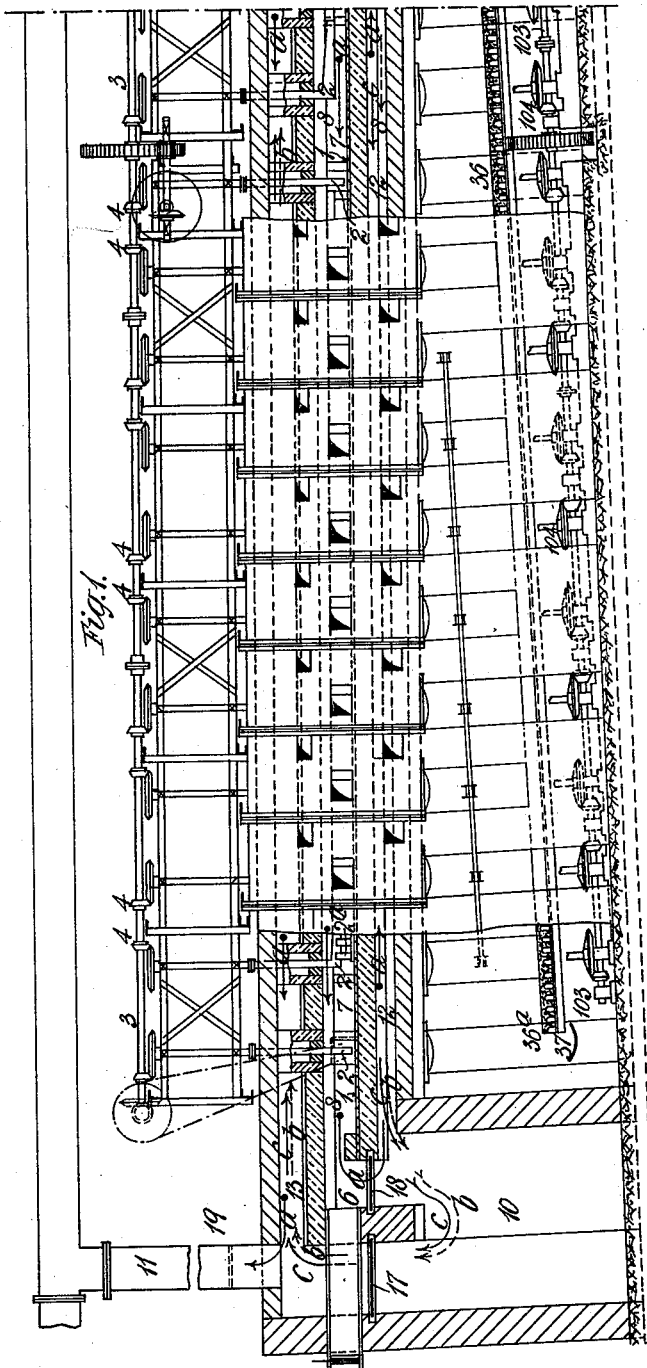
Attest:
Ewd L. Tolson
Edward N. Saitu
Inventor:
Thomas Edwards,
by Spear, Middleton, Donaldson & Spear
Attys.

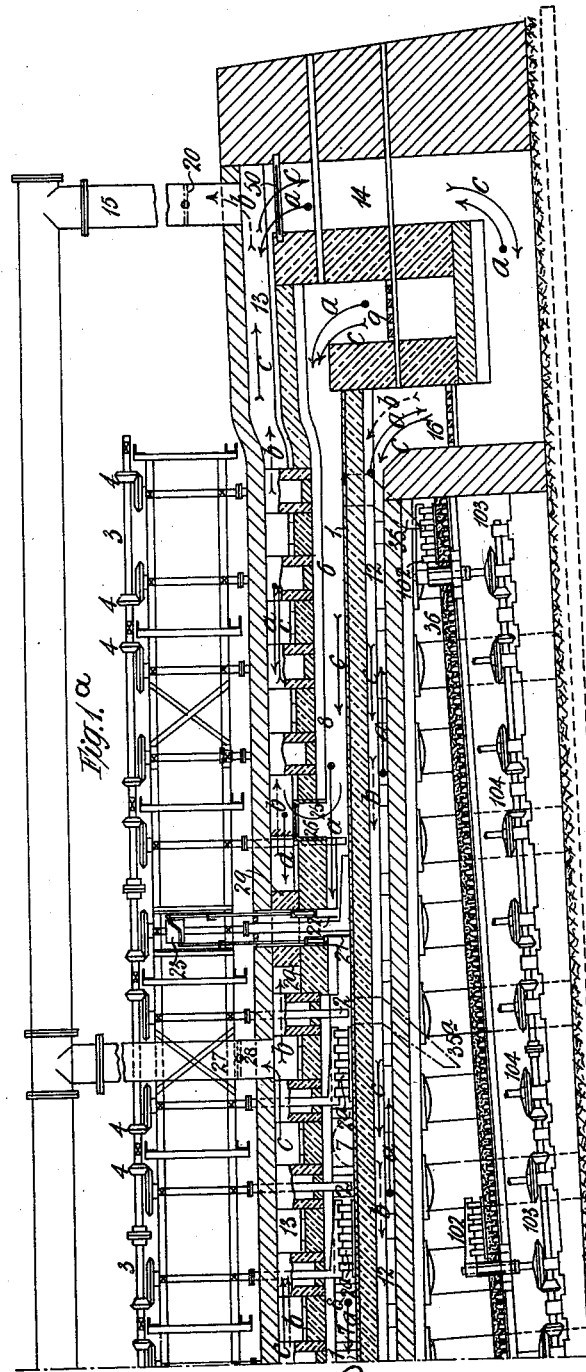

T. EDWARDS.
ORE ROASTING FURNACE.
APPLICATION FILED JAN. 18, 1911.
1,008,892.
Patented Nov. 14, 1911.
8 SHEETS—SHEET 3.
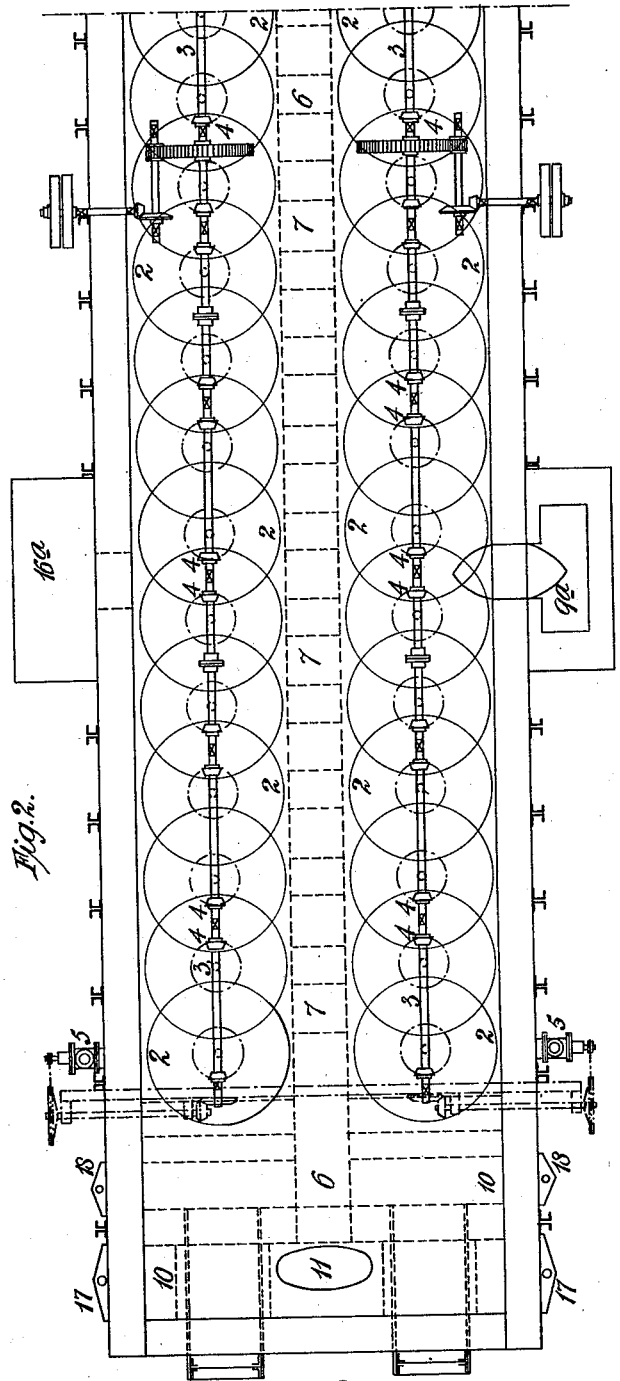
Attest:
Ewd L. Tolson
Edward N. Saxton
Inventor.
Thomas Edwards,
by Spear, Middleton, Donaldson & Spear
Attys.

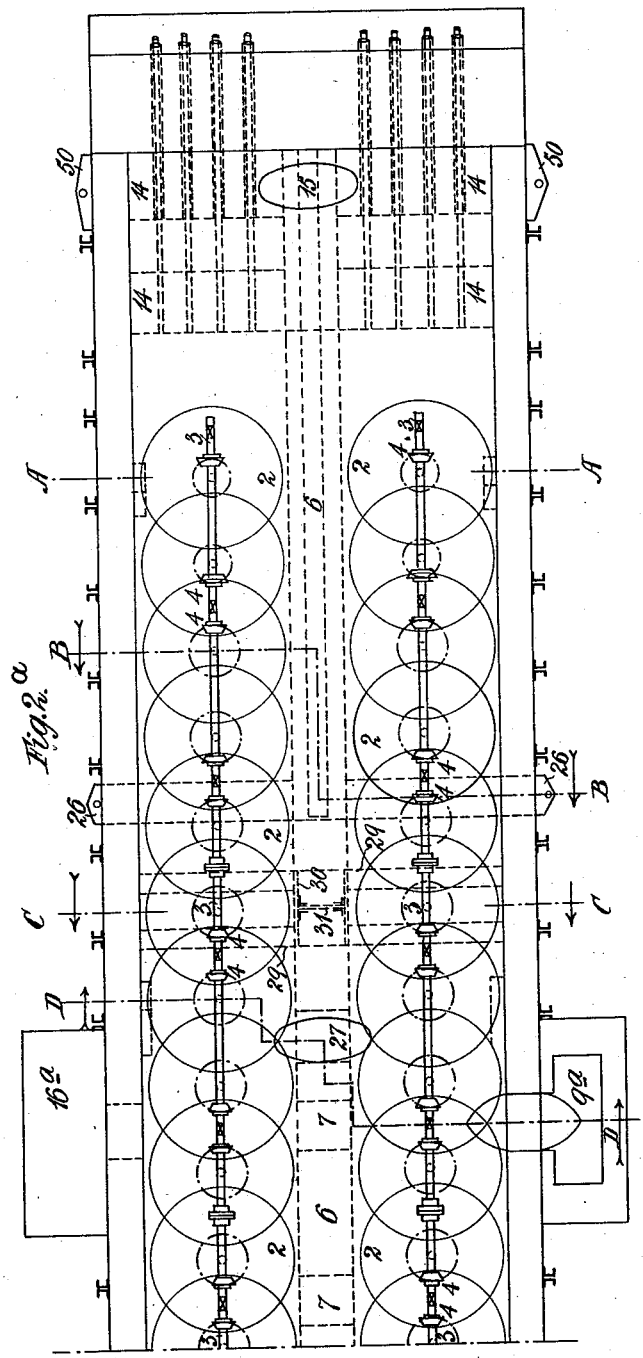

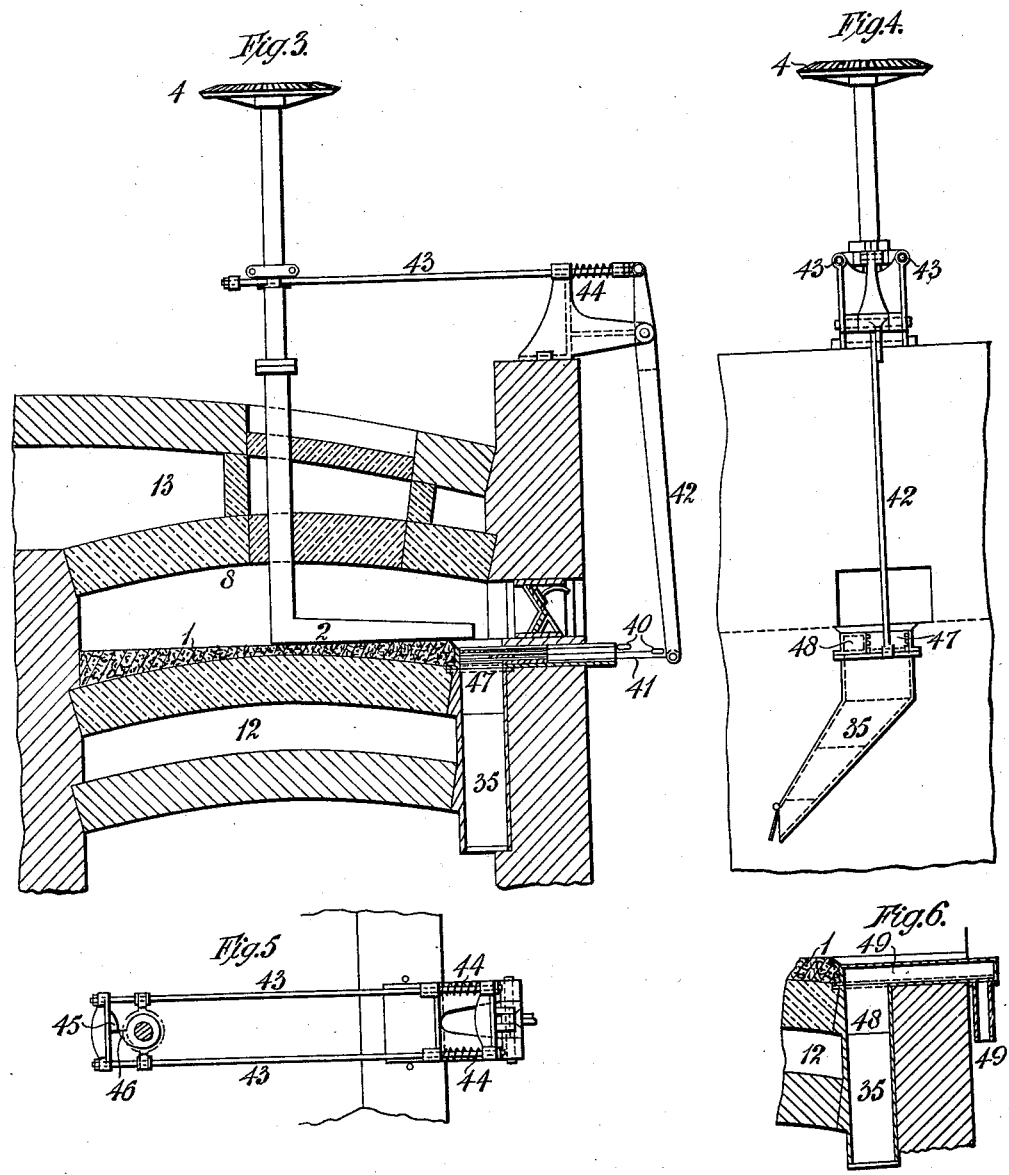

T. EDWARDS.
ORE ROASTING FURNACE.
APPLICATION FILED JAN. 18, 1911.

1,008,892.

Patented Nov. 14, 1911.
8 SHEETS—SHEET 6.

Attest:
Ewd L. Tolson
Edward N. Saxton

Inventor:
Thomas Edwards,
by Spear, Middleton, Donaldson & Spear
Attys

T. EDWARDS.
ORE ROASTING FURNACE.
APPLICATION FILED JAN. 18, 1911.
1,008,892.
Patented Nov. 14, 1911.
8 SHEETS—SHEET 7.
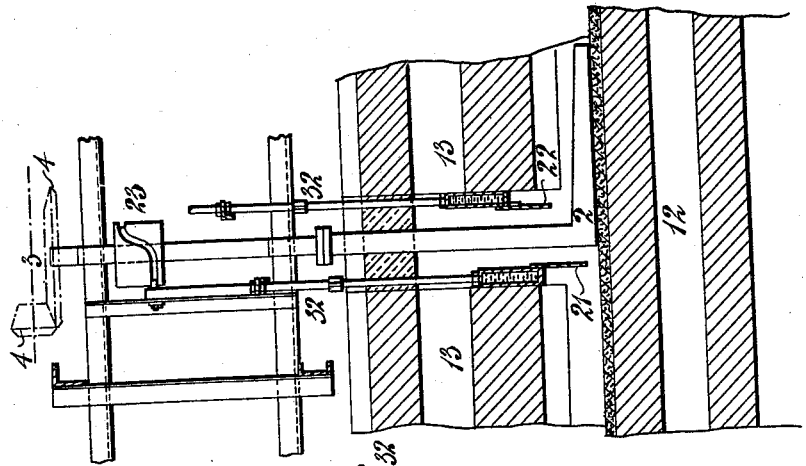
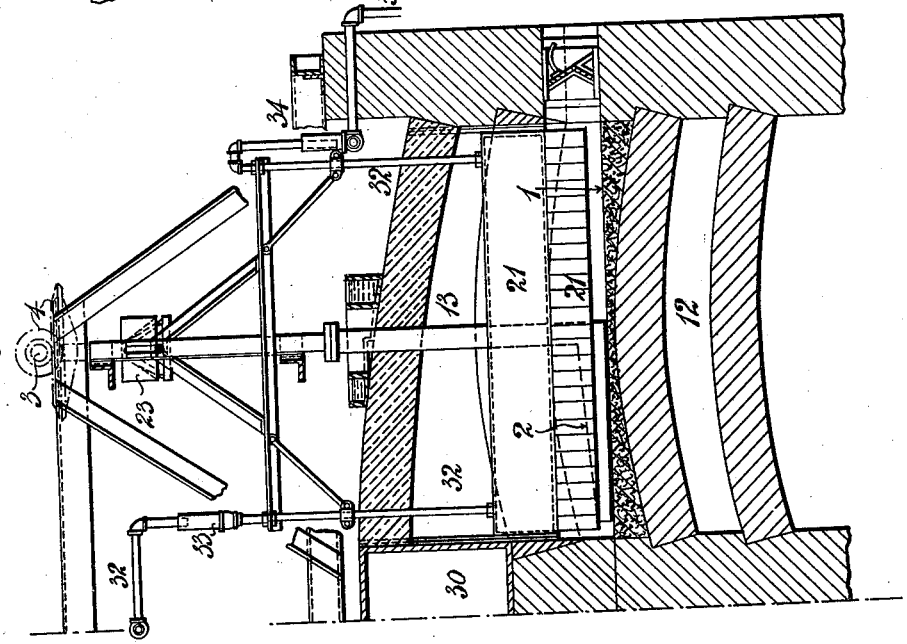

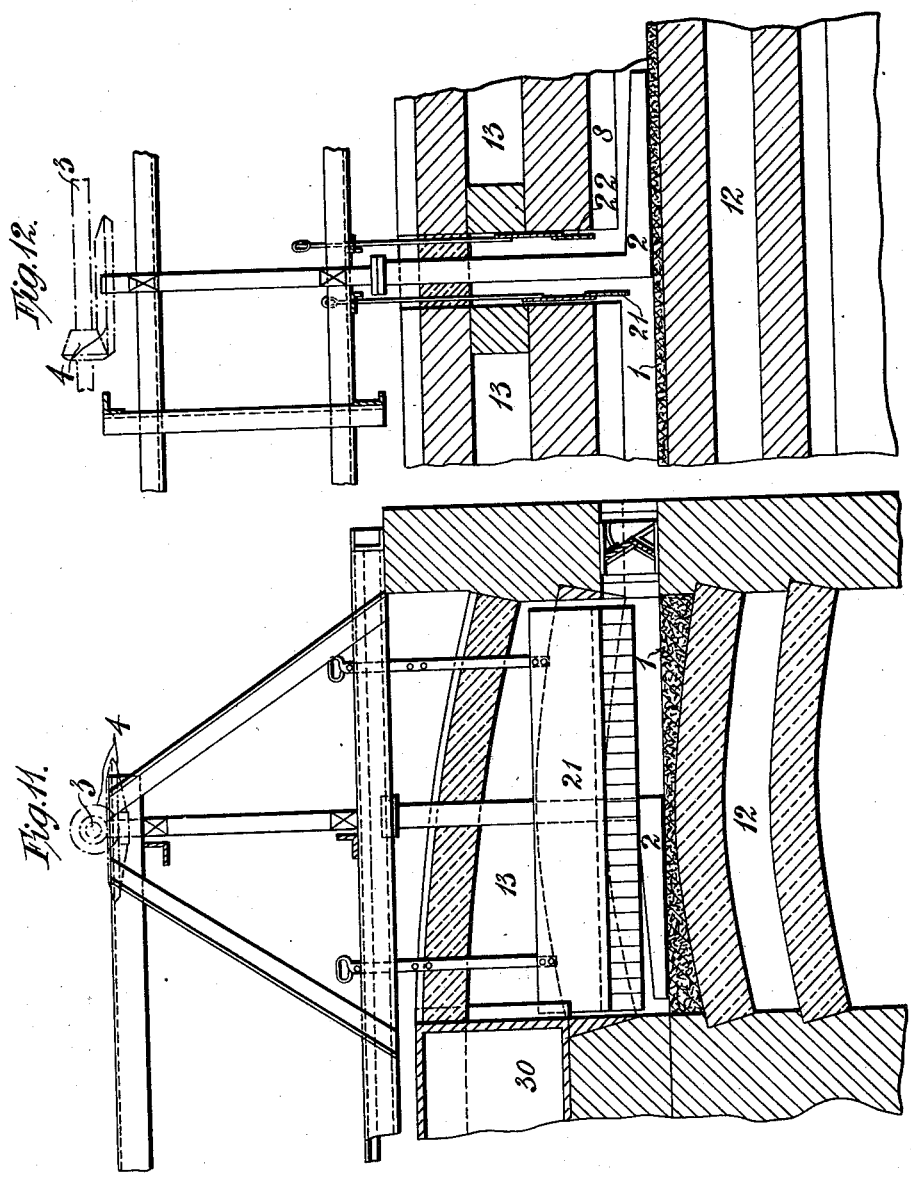

UNITED STATES PATENT OFFICE.

THOMAS EDWARDS, OF BALLARAT, VICTORIA, AUSTRALIA.

ORE-ROASTING FURNACE.

1,008,892.  Specification of Letters Patent.  Patented Nov. 14, 1911.

Application filed January 18, 1911. Serial No. 603,344.

*To all whom it may concern:*

Be it known that I, THOMAS EDWARDS, a citizen of the British Empire under King George the Fifth, residing at Ballarat, Victoria, Australia, have invented certain new and useful Improvements in Ore-Roasting Furnaces, of which the following is a specification.

This invention relates to improvements which, while applicable generally to furnaces for roasting ores, are specially designed for use in and are hereinafter described and shown in the accompanying drawings applied to furnaces of the construction in which a series of rotary rabbles are employed in conjunction with a plane working hearth and are arranged so that their paths of rotation intersect and serve to continuously and uniformly stir the ore and advance same from the feed end to the discharge end thereof, while provision is made for a continuous water circulation through such rotating rabbles so as to efficiently protect them from destruction by the intense heat to which they are subjected in the furnace.

The main object of the present improvements is to so construct furnaces for roasting ores as to cause same to operate as a combined reverberatory and muffle furnace, while at the same time, according to such improvements, provision is made which will enable said furnaces to be used at will either as a muffle furnace only or as a reverberatory furnace only.

The improvements further provide for the passage of the roasted charge from the working hearth to a cooling hearth along which such charge is continuously and gradually propelled by a similar arrangement of rotary rabbles as is employed for propelling the charge along the working hearth, and is subjected to a sprinkling or spraying action in the course of its travel, while finally a special construction of dust arrester is interposed between the working and the cooling hearths to prevent dust passing back to said working hearth and being carried off by the heated gases to the bustle pipe and so lost.

The accompanying drawings illustrate my improvements as applied to twin simplex furnaces, that is two furnaces arranged on the same horizontal plane with the working hearth common to both but separated by a division wall with arches establishing intercommunication between said twin furnaces, in each of which a single independent row of rabbles with intersecting paths of rotation is caused to agitate the ore on the hearth of its furnace and advance same from the feed toward the opposite end and discharge it on to a cooling hearth.

Figure 10:
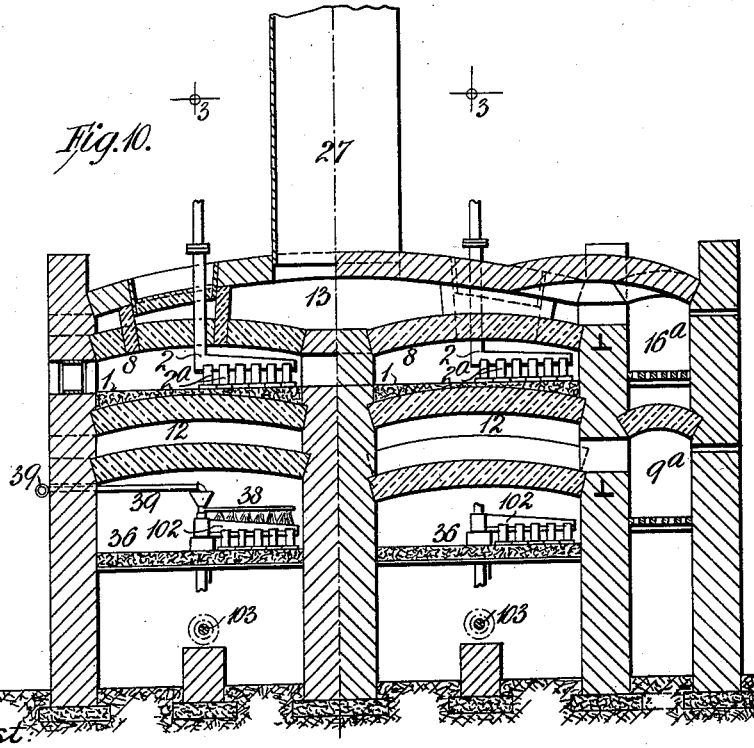

In these drawings Figure 1 is a side elevation, partly in vertical section, of one half of a complete furnace, and Fig. 1ª is a vertical longitudinal section of the other half; Fig. 2 is a plan view of the half or portion shown in Fig. 1, and Fig. 2ª is a similar view of the portion shown in Fig. 1ª. Fig. 3 is a part transverse section on line A—A of Fig. 2ª; Fig. 4 a side elevation of the dust arrester between the working and cooling hearths shown in Fig. 3; Fig. 5 a plan view of the arrangement for actuating said dust arrester, and Fig. 6 is a transverse section showing the dust discharge or outlet from such arrester; Fig. 7 is a transverse section in the direction of the arrow on the line B—B of Fig. 2ª; Fig. 8 is a transverse section in the direction of the arrow on the line C—C of Fig. 2ª, and Fig. 9 is a longitudinal section through the dampers arranged over the working hearth at this point of the furnace; Fig. 10 is a transverse section in the direction of the arrow on the irregular line D—D of Fig. 2ª; Fig. 11 is a transverse section also taken on line C—C of Fig. 2 in the direction of the arrow and showing a modification of the arrangement of dampers arranged at this point of the furnace, and Fig. 12 is a longitudinal section of Fig. 11; Figs. 3, 4, 5, 6, 8, 9, 10 and 11 are drawn to a larger scale than the other figures.

The principal feature of the present improvements consists in combining with the flue or passage over the working hearth of the furnace a separate flue or passage both above and below such hearth flue and in the provision of suitable firing furnaces or sources of heat for such flues or passages and dampers for regulating the connection thereof with such sources of heat and with suitable bustle pipes for the purpose as above stated of permitting the furnace to be used at will either as a combined reverberatory and muffle furnace or as a muffle furnace or a reverberatory furnace alone, to suit different requirements or operations and conditions which may present themselves in dealing with different classes of material to be treated or different results it is desired to attain.

In the drawings, 1, 1, is the working hearth of the twin simplex furnaces on which the rabbles 2 are caused to rotate through shafts 3 and bevel gears 4, the paths of rotation of such rabbles intersecting, and being set to allow same to pass each other and by their action continuously agitate the ore on hearth 1 and advance same from the feed end (to which it is supplied by the mechanical feeders 5) to the discharge end thereof. The rabbles nearest the furnace or discharge end are caused to rotate more rapidly by properly arranging the gear ratio.

The hearth 1, 1, is common to both furnaces, but is divided throughout its length by a division wall 6 with intercommunicating arches or openings 7 at intervals from the feed end for the greater portion of the length of the furnace, so that the two furnaces constitute twin simplex furnaces with a common working hearth, said openings being provided with means whereby they may be closed at will to enable either furnace to be operated singly. At the discharge end the flue or passage 8 directly over and open to the working hearth 1 communicates with the firing furnace 9, while at the opposite or feed end it opens into the end chamber or passage 10 communicating with the bustle pipe 11, so that the flames and gases from furnace 9, if allowed to pass directly over the whole length of the hearth 1, will pass out through chamber 10 to bustle pipe 11 and consequently allow the furnace to be employed as a reverberatory furnace only when desired.

A flue 12 is arranged below hearth 1 and another flue 13 above such hearth, both of said flues 12 and 13 communicating with the same chamber or passage 10 into which the feed end of flue 8 over hearth 1 enters as above stated. The opposite or discharge end of flues 12 and 13 open into a passage or chamber 14 connecting with a bustle pipe 15 and a firing furnace or other heating means 16 is provided at the end of said flue 12. A damper 17 is provided between chamber 10 and bustle pipe 11, and by closing this and firing furnace 9 the gases therefrom will follow the course indicated by the ball ended arrows $a$ over the whole length of the working hearth 1 back under same through flue 12 around furnace 9 and then over said hearth 1 through flue 13 and out through bustle pipe 11, thus causing the furnace to operate as a combined reverberatory and muffle furnace.

To enable the furnace to operate as a muffle furnace only a damper 18 is arranged in the flue 8 over the working hearth 1 at the feed end of the furnace and closes the connection of said flue 8 with the chamber 10, and the furnace then being fired at 16 at the discharge end of flue 12 beneath the hearth 1, the gases will pass in the direction of the broken arrows $b$ along flue 12 beneath said hearth 1 through chamber 10 and (the bustle pipe 11 having been closed by damper 19) back through flue 13 over hearth 1, and out through the bustle pipe 15 at the discharge end of the furnace. The damper 50 connecting flue 13 with chamber 14 will also have been closed.

When the furnace is used either as a reverberatory furnace only or as a combined reverberatory and muffle furnace the bustle pipe 15 will be closed by damper 20 with which same is provided.

To permit of the employment of the furnace as a reverberatory furnace for a portion of its length only in combination with a muffle action, and thus allow of a "sweet roast" being effected toward the discharge in the travel of the ore along the working hearth 1, at the point where the reverberatory action is desired to commence an arrangement of dampers is introduced in the flue 8 over said hearth. These dampers 21, 22 are shown in detail in Figs. 8 and 9, where same are illustrated as being alternately automatically raised and lowered by the action of cam 23 mounted on the shaft of one of the rabbles 22, so as to rise to permit of the passage of the rabbles 2 and to fall behind same after such passage, and thus close flue 8 of hearth 1. The muffle flue 13 over such hearth is also capable of being closed at this point, and the passage of the gases from the firing furnace 9 will then be in the direction of the ordinary full line arrows $c$ from such furnace 9 over working hearth 1 to the opening 25 slightly in advance of the dampers 21, 22, and which has been previously opened to the top muffle flue 13 by a damper 26, thus permitting the gases to return along such flue 13 to chamber 14 and (bustle pipe 15 having been closed by damper 20) to pass around firing furnace 9 and then along the under muffle flue 12 into and through the end chamber or passage 10, and finally back through the feed end of the upper muffle flue 13 to the point where same is closed for the passage of the dampers 21, 22, where a bustle pipe 27 is situated, through which the gases pass out.

In the case where the furnace is required to be used as a reverberatory furnace alone or a muffle furnace alone, or as a combined reverberatory and muffle furnace in the manner previously described, the bustle pipe 27 will be closed by a damper 28 with which same is provided, while the wall 29 forming the partition closing the upper muffle flue 13 has, as shown in Fig. 8, an open box 30 inserted through the center of same to permit of the passage of the gases through such partition either to bustle pipe 15 or back through the under muffle flue 12 as the case may be. This open box 30 is (as shown in plan in Fig. 2) fitted with a damper 31 to enable same to be closed when desired to employ the furnace as a reverberatory furnace only for a portion of its length only as last described, and in this case the damper 26 with which opening 25 from flue 8 is provided will be opened.

The dampers 21, 22 are made hollow and to protect them from heat a water circulation is maintained through the system of water pipes 32, which are fitted with water seals 33, 34 to permit of the vertical reciprocating movement of such dampers and allow the rabbles 2 to pass beneath same while insuring the closing of flue 8 of the working hearth 1 behind them.

The rabbles 2 which pass beneath dampers 21, 22 are unlike those situated over the remaining portion of the working hearth surface preferably unprovided with the downwardly projecting teeth 2ª serving to more effectually agitate the ore, so that the dampers thus unprovided with teeth simply serve to insure the continuous travel of the ore past the dampers 21, 22, while the reduction in their height permits the dampers to be brought down low enough to come practically in contact with the upper surface of the ore and thus effectually close the flue 8 of the working hearth 1 at this point.

Instead of actuating the dampers 21, 22 so as to cause same to reciprocate vertically as described and so close flue 8 behind said dampers after same have passed them, these dampers may as shown in Figs. 11 and 12 be simply mounted so that they can be adjusted by hand, being lowered so as to leave only sufficient space beneath them for the passage of the rabbles 2 to rotate when the draft is to be diverted from flue 8 into flue 13, and raised so as to leave flue 8 entirely unobstructed when the draft is to be continuous along such flue when the furnace is required to act as a reverberatory furnace throughout its entire length. The furnace may be provided with additional side firing furnaces 9ª and 16ª at any desired points, and communicating respectively with the working hearth flue 8 and the flues 12 or 13.

The ore after treatment in either of the manners hereinbefore described is by the action of the rabbles 2 continuously conveyed to the discharge opening or chute 35 which in full lines in Fig. 1 is shown at the end of the working hearth 1, but which as shown in broken lines at 35ª in such figure might be arranged at any desired intermediate point in the length of said hearth.

The end of chute 35 terminates over an inclined cooling hearth 36 arranged below the under muffle flue 12 and over the surface of which a series of rabbles 102 are caused to revolve in intersecting paths of rotation, being actuated through suitable gearing 104 from shaft 103, the action of such rabbles being to continuously stir the ore and cause same to travel along the surface of the cooling hearth 36 from the point where it is delivered thereto by chute 35 to the lower end 36ª, where it falls on to an endless band conveyer 37 by which it is conveyed out of the furnace.

The rabbles 102 are as shown in Fig. 10 preferably provided with a spraying device 38 supplied with water or with a chemical solution if desired from pipes 39 which as the ore is agitated and propelled forward by such rabbles along the hearth 36 is delivered thereon preferably slightly in advance of the latter, at about 15° in advance of the rotation thereof, by which means the cooling action is materially expedited.

As the treated ore under the propelling action of the rabbles 2 which delivers it to chute 35 falls down the latter on to the cooling hearth 36, a portion of the dust occasioned by its fall is liable to remain suspended and to be carried off by the draft through the flues and out through the bustle pipe from which the gases finally issue, and so become lost, and in order to prevent this loss I preferably employ the arrangement illustrated in detail in Figs. 3 to 6 inclusive of the drawings, where the chute 35 at its upper end besides being fitted with adjustable slides 40 which can be set to restrict the exit orifice to suit the rate of discharge, is also provided with a further slide 41 which is automatically actuated to entirely shut off the chute as soon as the discharge by the receding of rabble 2 ceases, and keep same closed until the rabble in its rotation again approaches the discharge opening, so that any dust will be prevented from passing back therethrough. This may be effected by means of the pivoted lever 42 connected at one end to such slide 41 and at its other end to the spring actuated frame 43, which under the action of spring 44 tends to keep said slide 41 normally closed. The frame 43 is fitted with a cam surface 45 and the spindle of rabble 2 carries a cam 46 acting in conjunction therewith so as to force frame 43 back against the action of its spring, and so through lever 42 open slide 41 at the desired time to allow of the passage of the ore into chute 35 on the advance of such rabble thereto, while immediately the rabble has passed such chute and cam 46 ceases to act on cam surface 45, the spring 44 will through lever 42 cause slide 41 to close.

The discharge opening 47 only extends partly across the top of the chute 35, the other part 48 of such top being closed and separated by a partition from the open part, a discharge opening 49 leading from the closed part 48 to the outside of the furnace (Fig. 6), whereby the dust shut off by the closing of slide 41 is free to pass to a suitable collector and so be saved.

Having thus described my invention what I claim is:—

1. In a roasting furnace, a working hearth having an ore space or flue, suitable rabbles located therein for agitating the ore and effecting its progressive movement, separate flues above and below said working hearth, a firing furnace for supplying a heating medium for the rabble flue, a separate furnace for supplying the heating medium to the flue below the hearth, a chamber at the feed end of the furnace with which all of said flues communicate, and suitable dampers for controlling the passage of the heating medium through said flues at will, substantially as described.

2. In a roasting furnace, a working hearth having an ore flue or passage, rabbles therein for agitating the ore and causing progressive movement thereof, a heating flue extending longitudinally above the ore flue, a second heating flue beneath the hearth, a firing furnace for supplying the heated products directly to the ore flue, a second furnace for supplying heated products directly to said second heating flue, damper controlled passages connecting all three of said flues at the feed end, and a bustle pipe provided with suitable dampers and connected with opposite ends of the upper heating flue, substantially as described.

3. In a roasting furnace, a working hearth provided with an ore chamber or flue, rabbles therein for agitating the ore and effecting its progressive movement, heating flues above and below the ore flue, a heating furnace at the discharge end of the furnace communicating with the ore flue, a passage or chamber at the discharge end affording communication between the adjacent ends of the heating flues, said passage or chamber including a damper, and a heating furnace for supplying heated products to the lower heating flue, a chamber or passage at the feed end of the furnace communicating with all three of said flues, and provided with dampers for controlling communication to the ore flue and to the upper heating flue, and a bustle pipe communicating with opposite ends of the upper heating flues and provided with suitable dampers controlling said connections, substantially as described.

4. In a roasting furnace, a working hearth having an ore chamber or flue, means for agitating ore thereon and effecting its progressive movement through the chamber, heating flues above and below the ore flue, means for supplying heated products at will to either the ore flue or the lower heating flue, and means for withdrawing the heated products from the ore flue at a point intermediate of its length and directing said products through the heating flue, substantially as described.

5. In a roasting furnace, a working hearth having an ore chamber or flue, means for agitating ore thereon and effecting its progressive movement through the chamber, heating flues above and below the ore flue, means for supplying heated products at will to either the ore flue or the lower heating flue, and means for withdrawing the heated products from the ore flue at a point intermediate of its length and diverting said products through the heating flue, said means including a device for obstructing the passage of heated products through the ore flue while permitting the passage of the ore therethrough, substantially as described.

6. In a roasting furnace, the combination with a working hearth over which rabbles are caused to rotate in intersecting paths, of a flue passing directly over the working hearth, dampers at an intermediate point in the length thereof obstructing such flue while permitting the passage of the rabbles beneath same, a separated flue above the working hearth and another separated flue below said hearth, a chamber at the feed end with which all three flues communicate and a chamber at the opposite end with which the separated top and bottom flues communicate, firing furnaces for said flues, an opening between the working hearth flue and the upper flue, and a bustle pipe communicating with the upper flue at a point in advance of that where the dampers are situated, and where said upper flue is obstructed, substantially as and for the purpose specified.

7. In a roasting furnace, a working hearth having an elongated ore passage or flue, and means for supplying heated products thereto, rabbles located in said flue for agitating the ore and causing progressive movement thereof, said rabbles having their paths of travel overlapping, said flue having an outlet intermediate of its length and a damper for obstructing the flue at one side of the outlet, and means for automatically removing the damper from the path of the rabbles to permit the passage of the rabbles and returning it to closing position, after the rabbles have passed, substantially as described.

8. In a roasting furnace having a working hearth provided with an ore passage or flue, a plurality of rotary rabbles located therein having overlapping paths, means for supplying heating products to said ore passage, an outlet from said ore passage intermediate of its length provided with a suitable damper, a pair of reciprocating dampers located on opposite sides of one of the rabbles in proximity to said outlet passage, and means for automatically operating them alternately as the rabble rotates, substantially as described.

9. A roasting furnace having a suitable roasting hearth, a cooling hearth beneath the roasting hearth and receiving the roasted ore therefrom, movable rabbles for said cooling hearth, and movable spraying devices for delivering a suitable fluid to the ore slightly in advance of the rabbles.

10. In a roasting furnace, a working hearth and a cooling hearth, a chute connecting said hearths through which the ore is periodically delivered, and means for automatically closing said chute between the periods of delivery, substantially as described.

11. In a roasting furnace, a roasting hearth provided with suitable rabbles, a cooling hearth, a chute connecting the roasting and cooling hearths and located in the path of one of said rabbles, a slide valve for closing said chute, and means for automatically opening the slide valve as the rabble approaches the chute, substantially as described.

12. In a roasting furnace, a roasting hearth, a cooling hearth, a chute connecting the same, means for periodically delivering ore from the roasting hearth to the chute, means normally closing the chute and automatically opening it to permit the delivery of the ore, and a permanently open outlet for the chute to the outside of the furnace, substantially as described.

13. In a roasting furnace, a roasting hearth, an elongated cooling hearth beneath receiving ore therefrom, rabbles for agitating the ore and impelling it along the cooling hearth, and fluid spraying means associated with the rabbles located near the delivery end of the cooling hearth, substantially as described.

14. In an ore roasting furnace, an ore receiving imperforate hearth, a continuous hearth flue over said hearth through which may pass fluids of combustion, a heating and a cooling device for the ore located beneath said hearth, and manually controlled connected upper and lower flues forming a continuous channel including said heating device and enveloping the walls of said hearth flue.

15. In an ore roasting furnace, an ore receiving imperforate hearth, a straight line hearth flue over the same, a heater for generating fluids of combustion located below said hearth, manually controlled connected straight line upper and lower flues forming a continuous channel including said heating device and enveloping the walls of said hearth flue for effecting the desired circulation of the fluids of combustion prior to atmospheric discharge, and an automatically controlled device coöperating with said hearth flue for breaking the continuity of the traversing fluids in said flue intermediate of its ends.

16. In an ore roasting furnace, an ore receiving imperforate hearth, a straight line hearth flue over the same, a heater for generating fluids of combustion located at one end of and connected with said hearth flue, manually controlled straight line upper and lower flues connected at both ends to form a continuous channel enveloping the walls of said hearth flue, the connection between said upper and lower flues at one end encircling said heater, and a second heater included in said connection.

17. In a roasting furnace, a continuous combustion flue or chamber having an ore-receiving hearth, a heating device and a cooling device located below said hearth, a plurality of rotating interacting stirrers operatively associated with said hearth and with said cooling device, and a manually controlled flue enveloping said continuous combustion flue or chamber and including the heating device and extending between said hearth and the cooling device for the free entrance thereinto of the fluids of combustion before atmospheric discharge.

18. In a roasting furnace, a continuous combustion flue or chamber therein having an ore-receiving hearth, a heater discharging into said chamber for initially generating fluids of combustion, a device for ultimately cooling the ore, a plurality of overlapping rotary stirrers coöperating with said hearth and said cooling device independently, and upper and lower straight line manually controlled connected flues which surround said heater and envelop said combustion flue or chamber, said lower flue being adjacent the cooling device, and an automatic device controlled by one of the stirrers for diverting the free flow of said fluids through said combustion chamber from end to end.

19. In a roasting furnace, a continuous ore-roasting hearth, an ore delivery chute located to one side of the roasting hearth and through which ore is fed from said hearth, a cooling device receiving ore from said chute, a heat generator for passing fluids of combustion throughout the length of said hearth, a manually-controlled conduit completely and continuously surrounding said hearth and said heat generator, and having atmospheric exit at each end, and an auxiliary device associated with said conduit for diverting the free flow of the fluids of combustion over said hearth from end to end.

20. In a roasting furnace, a centrally arranged roasting hearth and flue terminating short of each end thereof, a heat generator communicating therewith at one end and having free sides and bottom, upper and lower straight-line flues connected at the ends within the ends of the furnace, and surrounding said roasting hearth and flue, and arranged to receive the products of combustion emerging from the hearth flue before atmospheric discharge, an independent heat generator interposed in the connection at one end between the upper and lower flues, an ore cooling hearth beneath the lower flue, a gravity feed device intermittently feeding solid ore to said ore cooling hearth, and having provision for a pulverulent discharge exteriorly of said furnace.

21. In a roasting furnace, a centrally arranged roasting hearth and flue; terminating short of each end thereof, an ore cooling hearth beneath said roasting hearth, means for progressively advancing the heated ore upon said roasting hearth, and delivering it to the cooling hearth, and means for progressively advancing the ore in a reverse direction along the cooling hearth, an auxiliary conduit comprising connected flues continuously surrounding said ore roasting hearth and flue for the reception of the gases of the latter, regulating means at each end of the furnace permitting the atmospheric discharge of the gases, and a double heat generator between the end of said furnace and the point of ore delivery from the roasting hearth to the cooling hearth communicating with the roasting hearth flue and said conduit respectively.

22. In a roasting furnace, a centrally arranged ore roasting hearth and flue terminating short of each end of the furnace, an ore cooling hearth beneath said roasting hearth, means for progressively advancing the heated ore on said roasting hearth, means for delivering it from the roasting hearth to the cooling hearth, means for progressively advancing it upon the cooling hearth, an auxiliary conduit comprising upper and lower flues connected at the ends and continuously surrounding said roasting hearth and flue for the reception of the gases from the latter, regulating means at each end of the furnace permitting the atmospheric discharge of the gases, a double heat generator communicating with said roasting hearth flue, and said conduit respectively, and a shutter movably mounted in said roasting hearth flue and controlled by said ore advancing means.

23. In a roasting furnace, the combination of a plurality of superimposed longitudinal flues, one of said flues being an ore container free from integral barriers against the passage of gases, a heater disseminating gases thereinto, the remainder of said flues having communication at their ends and regulators directing a flow of gas thereinto before atmospheric discharge, an ore cooler beneath said flues, overlapping stirrers working in said ore container and ore cooler, and independent mechanism for actuating said stirrers mounted at the top and bottom of the furnace.

24. In a roasting furnace, the combination of a plurality of longitudinal flues, one of said flues being an ore container free from integral barriers against the normal passage of gases, a heater disseminating gases thereinto, the remainder of said flues having communication at their ends, and regulators directing a flow of gases thereinto before atmospheric discharge, an ore cooler, beneath said flues upon which the ore is progressively cooled, overlapping stirrers working in said ore container and ore cooler, independent mechanism for actuating said stirrers at the top and bottom of said furnace, means actuated by the top mechanism for regulating the atmospheric discharge of the gases in opposed directions with respect to said ore container, and separate means actuated by one of said stirrers for automatically expelling only solid ore from the latter, having provision for a pulverent exterior discharge.

In testimony whereof I affix my signature for a pulverulent exterior discharge.

THOMAS EDWARDS.

Witnesses:
ALICE M. HOLT,
BEATRICE M. LOWE.

---

Copies of this patent may be obtained for five cents each, by addressing the " Commissioner of Patents, Washington, D. C."